(12) United States Patent
Fleischer et al.

(10) Patent No.: US 8,870,427 B2
(45) Date of Patent: Oct. 28, 2014

(54) VEHICLE LIGHT AND METHOD FOR INSTALLING A VEHICLE LIGHT

(75) Inventors: Walter Fleischer, Munich (DE); Richard Feder, Mauern (DE); Joerg Meichsner, Garmisch-Partenkrichen (DE); Birger Oswald, Stassfurt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/602,889

(22) Filed: Sep. 4, 2012

(65) Prior Publication Data
US 2013/0039082 A1 Feb. 14, 2013

Related U.S. Application Data

(63) Continuation of application No. PCT/EP2011/052905, filed on Feb. 28, 2011.

(30) Foreign Application Priority Data

Mar. 5, 2010 (DE) .......................... 10 2010 010 414

(51) Int. Cl.
*F21V 7/04* (2006.01)
*B21D 39/03* (2006.01)
*B60Q 1/26* (2006.01)
*B60Q 1/30* (2006.01)

(52) U.S. Cl.
CPC .............. *B60Q 1/2619* (2013.01); *B60Q 1/302* (2013.01)
USPC .............. 362/549; 362/487; 362/546; 29/428

(58) Field of Classification Search
CPC .............................. B60Q 1/2619; B60Q 1/302
USPC .............................. 362/487, 549, 546; 29/428
See application file for complete search history.

(56) References Cited

U.S. PATENT DOCUMENTS

5,410,782 A * 5/1995 Holyoake ........................ 24/505
5,964,523 A * 10/1999 Eversberg ..................... 362/365
(Continued)

FOREIGN PATENT DOCUMENTS

AU       752 428 B2      6/2000
DE   196 05 967 A1      8/1997
(Continued)

OTHER PUBLICATIONS

German Search Report dated Feb. 15, 2011 with partial English translation (nine (9) pages).
(Continued)

*Primary Examiner* — Thomas M Sember
*Assistant Examiner* — Tsion Tumebo
(74) *Attorney, Agent, or Firm* — Crowell & Moring LLP

(57) ABSTRACT

A vehicle light, which may be a third brake light, includes an insertion portion for inserting in a recess of a vehicle component and a contact portion for placing the brake light on an edge of the recess. The contact portion protrudes at least in sections past the side of the insertion portion, wherein the insertion portion has at least one catch element designed for catching the brake light on the vehicle component. The insertion portion further has at least one locking element for sliding the at least one catch element in the direction of the contact portion. The locking element is implemented as a lever. The method can be used for installing such a vehicle light, in particular a brake light.

16 Claims, 5 Drawing Sheets

(56) References Cited

U.S. PATENT DOCUMENTS

| | | | |
|---|---|---|---|
| 8,148,634 B1* | 4/2012 | Gretz | 174/50 |
| 8,256,728 B2* | 9/2012 | Wright | 248/221.11 |
| 2002/0131271 A1 | 9/2002 | Schubert et al. | |
| 2004/0164207 A1 | 8/2004 | Decanio et al. | |
| 2006/0215416 A1* | 9/2006 | Lucas et al. | 362/545 |
| 2009/0084915 A1 | 4/2009 | Fukumoto et al. | |

FOREIGN PATENT DOCUMENTS

| | | |
|---|---|---|
| DE | 100 29 102 A1 | 1/2002 |
| DE | 10 2004 006 970 A1 | 9/2005 |
| DE | 600 34 408 T2 | 8/2007 |
| DE | 10 2007 006 257 A1 | 8/2008 |
| DE | 10 2007 035 496 A1 | 1/2009 |
| EP | 0 838 370 A2 | 4/1998 |
| EP | 1 645 467 A2 | 4/2006 |
| ES | 2 186 575 A1 | 5/2003 |
| FR | 2 905 093 A1 | 2/2008 |
| GB | 832921 A | 4/1960 |
| WO | WO 00/65703 A1 | 11/2000 |

OTHER PUBLICATIONS

International Search Report dated May 6, 2011 with English translation (six (6) pages).

* cited by examiner

VEHICLE LIGHT AND METHOD FOR INSTALLING A VEHICLE LIGHT

CROSS REFERENCE TO RELATED APPLICATIONS

This application is a continuation of PCT International Application No. PCT/EP2011/052905, filed Feb. 28, 2011, which claims priority under 35 U.S.C. §119 from German Patent Application No. 10 2010 010 414.0, filed Mar. 5, 2010, the entire disclosures of which are herein expressly incorporated by reference.

BACKGROUND AND SUMMARY OF THE INVENTION

The invention relates to a vehicle light, in particular a brake light, and even more specifically a third or high mounted brake light, as well as a method for installing a vehicle light, in particular a brake light.

FIG. 1 is an oblique view of a conventional high mounted or third brake light 100. FIG. 2 is a side view of a section of the brake light 100, inserted into a recess S of a vehicle component F.

Referring to the two figures, the brake light 100 has an insertion portion 101 for inserting into the recess S and an attachment portion 102 for placing the inserted brake light 100 on an edge R of the recess S. The attachment portion 102 projects at least in sections laterally (in the x and/or y direction) beyond the insertion portion 101 and the recess S. In this case, the attachment portion 102 projects in the circumferential direction laterally beyond the recess S, in order to prevent moisture and dirt from penetrating into the recess S. For this purpose the attachment portion 102 has a circumferential seal 103 on the laterally protruding area on the side facing the vehicle component F. The seal 103 is carried by a light transmissive for example, red tinted—plate-like cover 104. The cover 104 covers at least one light source (not shown)—for example, a light emitting diode—of the brake light 100 and points in one light emitting direction. Whereas the attachment portion 102 extends more or less in the x/y plane, the insertion portion 101 stands upright, more or less perpendicular to said plane, in the z direction.

The at least one light source is typically housed in a base body 109 of the insertion portion 101. The base body 109 is provided with a cable duct or an electrical terminal 105 for inserting or connecting at least one electrical line for supplying and, if desired, actuating the at least one light source. Furthermore, four inversely 'U' shaped, inwardly flexible catch elements 106 are attached to the base body 109. The catch elements 106 widen laterally at their end pointing towards the attachment portion 102 and, thus, form in each case on both sides an outwardly directed latching projection 107. In a non-pressed-in state of the catch elements 106 (or rather the relaxed state), the latching projection 107 projects laterally beyond the recess S. In more concrete terms the latching projection 107 has more or less the shape of a ramp, which widens in the direction of the attachment portion 102 and then drops steeply away at an edge relative to the attachment portion 102.

In order to facilitate a tight fit of the brake light 100, the catch elements 106 can be displaced or, more specifically, pressed in the direction of the attachment portion 102 by way of a locking bar 108, which can be slid in the longitudinal direction of the brake light 100, corresponding to the x orientation, and can be locked in a locking position.

In order to install the brake light 100 in the vehicle component F, the brake light 100 together with its insertion portion 101 with the unlocked catch elements 106 is slid in an insertion direction, corresponding to the z direction, into a recess S. If the latching projections 107 of the catch elements 106 hit the edge R of the recess S, they are pressed elastically inwards into the base body 109 with an advancing slide-in movement until the edge of the latching projection 107 has passed the edge R of the recess S. Thereafter, the latching projection 107 unlatches again and engages in a latching manner behind the vehicle component F in the area of the recess S, i.e., it latches the brake light 100 at the recess S. The steep edge of the latching projection 107 prevents the insertion portion 101 from sliding out of the recess S again. In the installed state, the edge R of the recess S is pressed in between the latching projections 107 of the catch elements 106 and the seal 103. Since the locking bar 108 is laterally displaced into the locking position, the catch elements 106 are pressed even more firmly against the edge R, a state that increases the leak tightness.

In the case of the brake light 100 known from the prior art, the amount of physical effort required for a reliable latching action and, thus, installation is comparatively high. In addition, the latching action of all catch elements 106 can be determined only with difficulty, so that in some cases the latching action may fail to come about locally and may not be detected, so that dirt and moisture may penetrate into the recess S, a situation that can lead, for example, to the failure of one or all light sources. In addition, an adaptation of the recess S and a stamping of the vehicle component F, especially if made of sheet metal, in conjunction with the seal 103 and the at least one catch element 106 of the brake light 100 is costly. Furthermore, the illustrated arrangement is not very robust. In addition, the costs for the guarantee, warranty and goodwill (GWG costs) are comparatively high. In addition, an overlap or rather potentially detrimental contact occurs between the latching projections 107 and the seal 103, so that the seal 103 may be already damaged in the uninstalled state.

The object of the present invention is to avoid or at least minimize at least one of the aforementioned drawbacks and to provide, in particular, a brake light, which can be reliably installed and, if required, also removed with a minimum of physical effort.

The present invention solves this problem by providing a vehicle light, comprising an insertion portion for inserting the vehicle light into a recess of a vehicle component, and an attachment portion for placing the inserted vehicle light on an edge of the recess, wherein the attachment portion projects, at least in sections, laterally beyond the insertion portion. The insertion portion has at least one catch element, wherein the catch element is designed to latch the vehicle light—in particular, to engage in a latching manner behind the vehicle light—at the vehicle component, especially during insertion into the recess. The insertion portion has at least one locking element for displacing the at least one catch element in the direction of the attachment portion, and the at least one locking element is designed as a lever.

Therefore, following engagement behind the recess in a latching manner, the vehicle light can be moved toward the vehicle component by pivoting the at least one lever, so that the vehicle light can be pressed down against the vehicle component. In this case the amount of physical effort required for a secure latching action and pressure thrust is comparatively small. In addition, it is easy to see whether all of the catch elements have been properly latched and pressed down. Moreover, an adaptation of the recess and a stamping of the vehicle component, made in particular of sheet metal, in conjunction with the attachment portion, in particular a seal thereof, and the at least one catch element is also comparatively easy to accomplish. In addition, the illustrated arrangement is robust and fail safe. In addition, the GWG costs for the guarantee, warranty and goodwill are comparatively low. In addition, the overlap between the catch element and the seal is avoided.

The vehicle light can be, in particular, a brake light, and even more particularly a third or high mounted brake light.

The vehicle component can be a part of a vehicle for example, a spoiler, or an accessory part or a spare part. The vehicle component can be designed as a housing; and, hence, the vehicle light can be inserted into a housing.

In one arrangement of the vehicle light on an exterior area of the vehicle, the attachment portion can represent an external cover against the surrounding area, whereas the insertion portion can be found, for example, in the interior of the vehicle. Especially in this case the attachment portion is provided with a seal, in order to prevent dirt and/or moisture from penetrating into the vehicle. The insertion portion can extend out—in particular, perpendicular—from the attachment portion.

In one embodiment that the lever can be pivoted between an unlocking position and a locking position, so that, when the lever is in the unlocking position, the catch element can assume a greater distance from the attachment portion than when the lever is in the locking position. As a result, a more secure fit of the vehicle light can be achieved by way of an especially simple operation of the lever.

In an additional embodiment, the lever can be latched in the locking position—in particular, at the insertion portion. This feature eliminates the possibility of unintentionally transferring the lever out of the locking position into the unlocking position and, thus, prevents the formation of local leaks.

In yet another embodiment, the at least one lever has at least one eccentrically shaped contact area exhibiting a minimum distance from the attachment portion in the locking position that is smaller than in the unlocking position. As a result, a pivot movement of the lever can be converted very easily into a linear displacement of the catch element on the vehicle component or into a direct thrust pressure of the lever against the vehicle component.

In a particular embodiment, the eccentrically shaped contact area of the lever makes contact with the catch element, in order to move the catch element.

In an alternative embodiment, the lever and the catch element are made in one piece; and the at least one eccentrically shaped contact area lies directly opposite the attachment portion. As a result, the lever can serve directly as the catch element; and, thus, it is possible to dispense with intermediate elements, such as catch clamps, serving as the catch elements. This feature can reduce the number of component. The eccentrically shaped contact area can serve directly to press down and secure the vehicle light.

In addition, in one embodiment the catch element has, at least in sections, a cross sectional profile that is more or less in the shape of an inverse U; and each of the two legs of the catch element has at least one outwardly pointing latching projection. However, the catch element is not restricted to such a design. Hence, a catch element can also be arranged on only one side of the base body, for example more or less in the form of a flat plate or retaining part. For example, the catch elements can be arranged only on one side of the base body; or as an alternative the catch elements can be present on both sides of the base body, but then not directly connected together or made in one piece, but rather as elements that can be actuated independently of each other.

In a special embodiment the catch element has at least two areas, each of which exhibits such an essentially inversely U shaped cross sectional profile. For example, the catch element can comprise two individual catch elements (for example, catch clamps, which then correspond somewhat to the two areas); and thus, provide the possibility of dispensing with two levers. The two areas can be separated from each other, for example, by the lever.

Furthermore, in an embodiment the lever is designed in the form of a clip (especially in the inverted 'U' shape). This design makes it easy to perform a displacement movement with a single lever motion on both sides (at both legs). This feature can prevent, first of all, a catch element from canting and/or secondly enables a reliable latching action. However, as an alternative, the lever does not have to be designed in the shape of a clip; for example, the lever may be designed more or less linear.

In addition, in one embodiment the lever is mounted on the insertion portion in a rotatable manner relative to a uniquely defined axis of rotation. As a result, the lever can be moved only about the same axis of rotation.

In yet another embodiment, the lever can be pivoted with no axis—that is, without an axis of rotation that is uniquely defined in each position—at the insertion portion. This feature makes it possible to dispense with any device for a uniquely defined pivot mounting of the lever at the insertion portion.

The invention further includes a method for installing a vehicle light, in particular a brake light as described above, wherein the method has at least the following steps: (a) inserting an insertion portion of the vehicle light through the recess of the vehicle component, until the at least one catch element unlatches laterally following passage through the recess; and (b) pivoting the at least one lever such that the associated catch element moves in the direction of the attachment portion, so that a peripheral region of the vehicle component that surrounds the recess is pressed in, at least in sections, between the insertion portion and the attachment portion.

It is a further development that in the step of pivoting the at least one lever, the lever with its eccentrically shaped contact area displaces the catch element in the direction of the attachment portion.

In an alternative further development in the step of pivoting the at least one lever, the lever itself with its eccentrically shaped contact area moves toward the attachment portion. This feature offers the possibility of dispensing with a separate catch element.

Other objects, advantages and novel features of the present invention will become apparent from the following detailed description of one or more preferred embodiments when considered in conjunction with the accompanying drawings. At the same time identical or functionally equivalent elements are provided with the same reference numerals for the sake of a better overview.

DETAILED DESCRIPTION OF THE DRAWINGS

Figure 1:
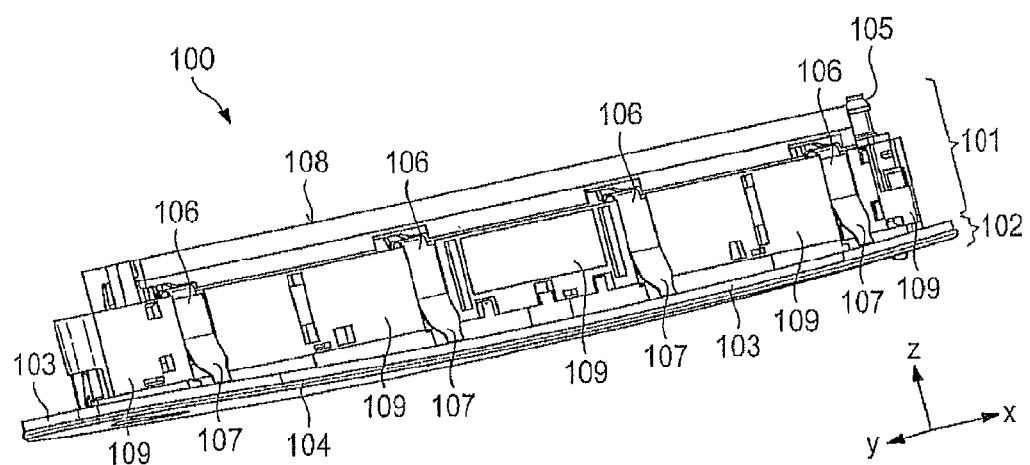
FIG. 1 is a perspective view of a conventional high mounted or third brake light 100.
Figure 2:
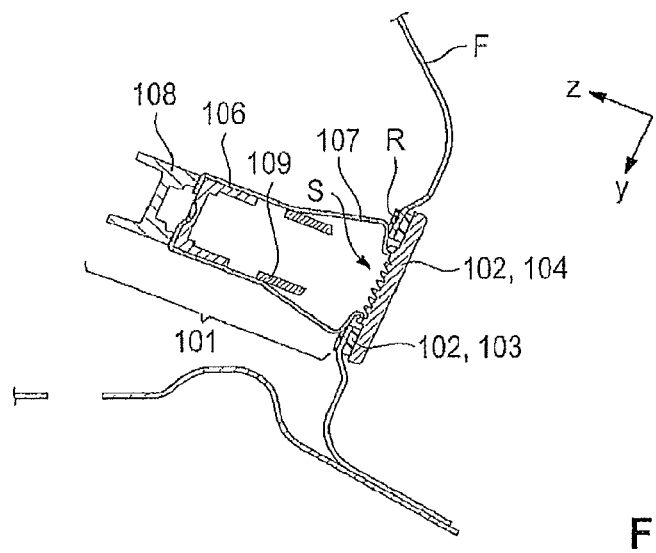
FIG. 2 is a side view of a section of the brake light 100, inserted into a recess S of a vehicle component F.
Figure 3:
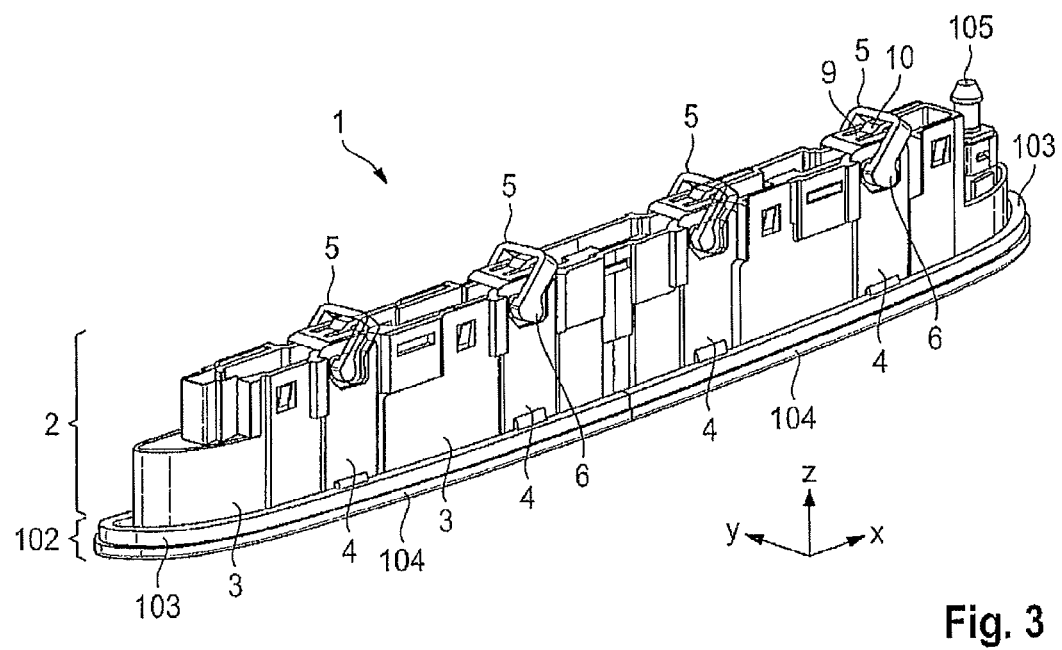
FIG. 3 is a perspective view of an inventive brake light according to a first embodiment.
Figure 4:
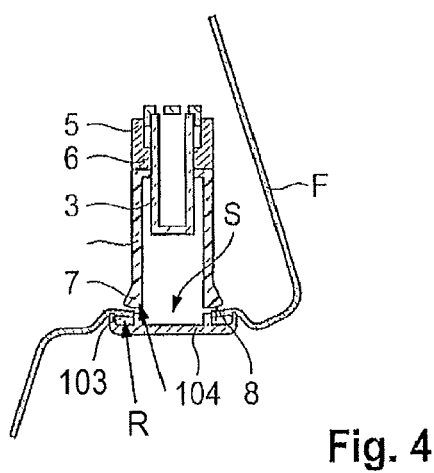
FIG. 4 is a side view of a section of the brake light, which is inserted into a recess of a vehicle component, according to the first embodiment.

FIG. 3 is a perspective view of an inventive vehicle light in the form of a brake light 1, according to a first embodiment. FIG. 4 is a side view of a section of the brake light 1, which is inserted into a recess S of a vehicle component F.

The brake light 1 is basically constructed in a manner analogous to the brake light 100 with an insertion portion 2, for inserting into the recess S, and with the attachment portion 102. The brake light 1 also has catch elements 4, which are mounted on the base body 3 so as to be displaceable perpendicularly (in z orientation). However, now the catch elements are also displaceable in the direction of the attachment portion 102 by way of a clip-shaped lever 5, which is rotatably mounted on the base body 3.

Figure 5:
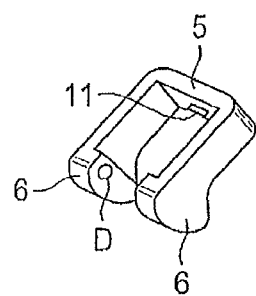
FIG. 5 is a perspective view of a lever of the brake light, according to the first embodiment.
Figure 6:
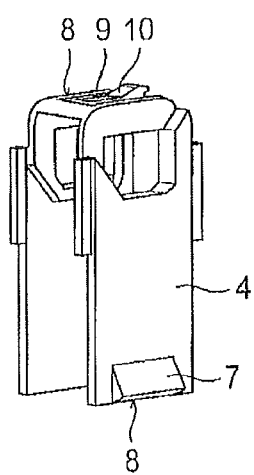
FIG. 6 is a perspective view of a catch element of the brake light, according to the first embodiment.
Figure 7:
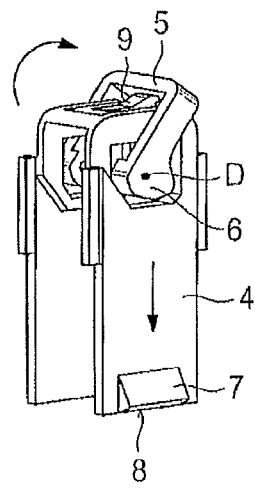
FIG. 7 is a perspective view of a combination consisting of the lever and the catch element of the brake light, according to the first embodiment.

The lever 5 is shown in FIG. 5 as a single part. In FIG. 3, the lever 5 is shown alternatingly as a wire body and as a solid body. By pivoting a respective lever 5, an associated catch element 4, which is shown as an individual part in FIG. 6, can be displaced by itself. The catch element 4 has an inversely 'U' shaped (clamp shaped) cross sectional profile. At the same time the lever 5 can be pivoted between an unlocking position, in which the catch element 4 can be displaced comparatively far upwards (in the z direction), and a locking position (which is shown in FIG. 7), in which the lever 5 presses the catch element 4 downwards (opposite the z direction). For this purpose the lever 5 has an eccentrically shaped contact area 6 with a (minimum) distance from the attachment portion 102 in a locking position that is less than in an unlocking position. When the lever 5 is pivoted about its axis of rotation D out of the unlocking position into the locking position, a state that is indicated by the curved arrow in FIG. 7, the eccentrically shaped contact area 6 then presses the catch element 4 downwards, as indicated by the straight arrow in FIG. 7, due to an extension of the load arm.

The catch element 4 has, on both sides, a latching projection 7, which is located on the outside of each leg in a free end area. When this latching projection is in its not-pressed-in state or rather its relaxed state, it projects laterally beyond the recess S, as shown in FIG. 4. In this case, too, the latching projection 7 has in essence the shape of a ramp, which widens downwards (in the direction of the attachment portion 102 or rather the lower edge of the catch element 4) and then drops steeply away at an edge 8. The catch element 4 and, thus, the latching projection 7 are made of an elastically flexible synthetic plastic material. The latching projection 7 has a fastening function that is basically the same as that of the latching projection 107.

Furthermore, the top side 8 of the catch element 4 has a latching lug 10, which is arranged on a resilient retaining part 9 and which holds in a detachably latched manner just the lever 5 alone in the locking position. For this purpose the lever 5 has a suitable latching recess 11.

In order to install the brake light 1 in the vehicle component F, the brake light 1 together with its insertion portion 2 with the unlocked catch elements 4 is slid in an insertion direction, which corresponds to the z direction, into the recess S. If during this procedure the latching projections 7 of the catch elements 4 hit the edge R of the recess S, they are pressed with an advancing slide-in movement elastically inwards into the base body 3, until the edge 8 of the latching projection 7 has passed the edge R of the recess S. Thereafter, the latching projection 7 unlatches again and engages in a latching manner behind the edge R or rather latches the brake light 1 at the recess S, as shown in FIG. 4. When the lever 5 is then transferred from the unlocking position into the locking position, the catch elements 4 are pressed in each instance against the edge R and, in so doing, the seal 103 is also pressed against the other side of the edge R.

For the brake light 1, the amount of physical effort required for a reliable latching action and subsequent compression against the vehicle component F is comparatively low. In addition, it is easy to determine whether all of the catch elements 106 have been properly latched and pressed down. Even an adaptation of the recess S and a stamping of the vehicle component, especially made of sheet metal, in conjunction with the seal 103 and the at least one catch element 4 is now comparatively easy to accomplish. In addition, the illustrated arrangement is robust and fail safe. In addition, the GWG costs for the guarantee, warranty and goodwill are comparatively low.

In order to facilitate a reliable engagement in a latching manner, the catch element 4 can be held at the top in the opened or unlocking position (in particular, away from the attachment portion). For this purpose the lever 5 has a lug, which serves as an end stop for the catch element 4 in the downward direction (in the direction of the attachment portion), so that when the lever 5 is pivoted, the lug descends into the closed or locking position, in order to enable a movement of the catch element 4 in the direction of the attachment portion.

Figure 8:
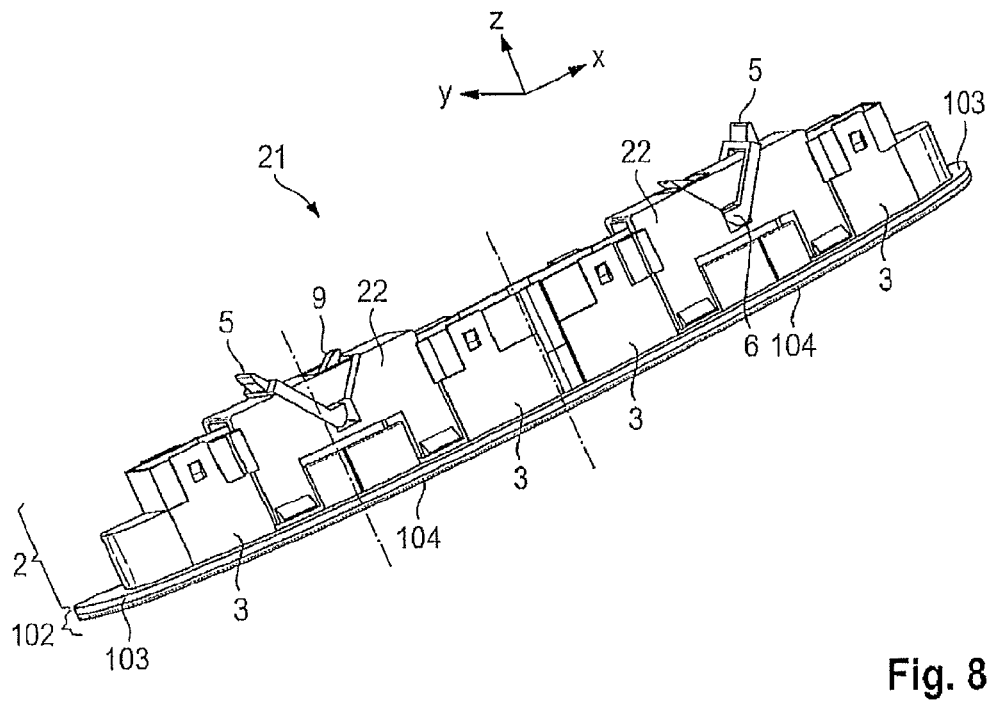
FIG. 8 is a perspective view of an inventive brake light, according to a second embodiment.

FIG. 8 is a perspective view of a brake light 21, according to a second embodiment. The brake light 21 is constructed in a manner analogous to that of the brake light 1. However, now only two catch elements 22 are used; and these two catch elements are elongated in the longitudinal direction (in the x direction) and have two latching projections on both sides. The catch element 22 can also be deemed to have two catch elements 4 and operationally achieves the same effect, except that the second embodiment offers the possibility of dispensing with two levers 5.

Figure 9:
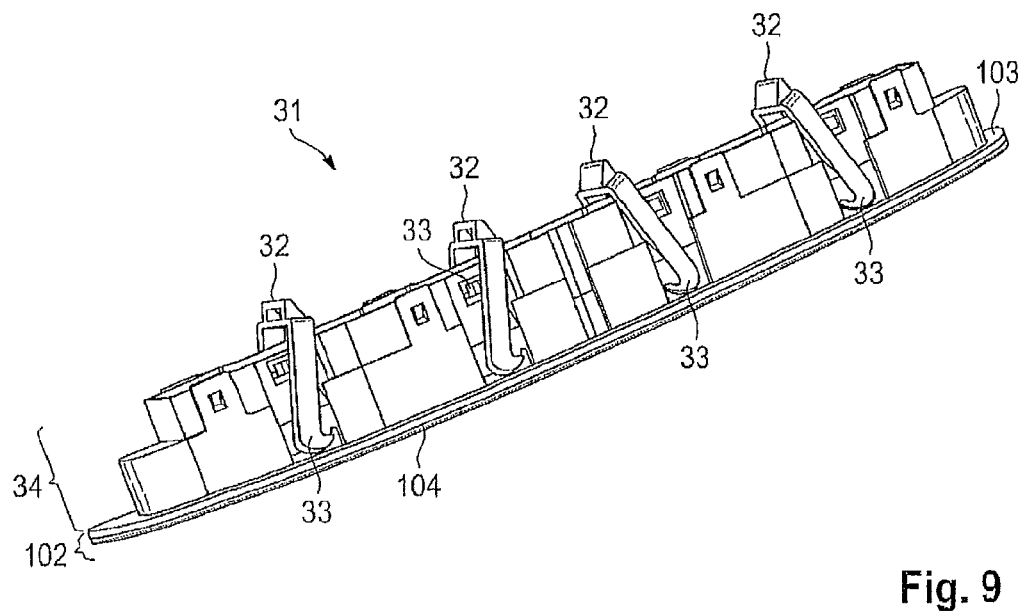
FIG. 9 is a perspective view of an inventive brake light, according to a third embodiment.

FIG. 9 shows a brake light 31, according to a third embodiment, with four levers 32.

Figure 10:
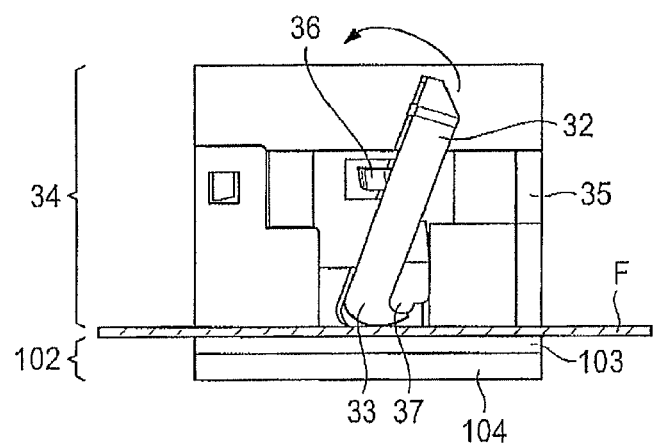
FIG. 10 is a side view of a detail of the brake light, according to the third embodiment, in one area of a lever.

FIG. 10 shows a detail of the brake light 31 in a region of one of the levers 32. In this embodiment, the levers 32 also serve in each instance as the catch elements and represent, in other words, a combined lever/catch element, which can be made, in particular, in one piece, for example, of a synthetic plastic material.

Both sides of the lever 32 have outwardly projecting latching projections 33. In order to latch, at least the legs of the levers 32 are designed to be at least inwardly elastic (spring-like), so that during insertion of the insertion portion 34, the legs are pressed inwards, until they pass through the recess S and then unlatch again, as shown in FIG. 10. In order to press the brake light 31 even more firmly against the vehicle component F, the latching projections 33 are designed so as to be eccentrically shaped at the contact area with the vehicle component F; and the contact area lies directly opposite the attachment portion 102 or, more specifically, makes contact with the vehicle component F in the installed state. Therefore, when the lever 32 is pivoted out of the unlocking position, shown in FIG. 10 and indicted by the curved arrow, a latching projection 33 can act simultaneously as a lever extension, which presses the vehicle component F in between itself and the seal 103. In this case, too, a base body 35 of the insertion portion 34 has at least one elastically mounted latching lug 36 for latching the lever 32 in the locking position; and in this example the latching lug is arranged now laterally at the base body 35. In FIG. 9 all of the levers 32 can be found in the unlocking position; and the two left levers 32 and the two right levers 32 point in the opposite direction in order to guarantee good accessibility.

The lever 32 can be mounted on the base body 35 so as to be rotatable about a fixed axis of rotation—for example, by way of recesses or lugs, which engage rotatably with corresponding lugs or recesses of the base body 35. However, in the third embodiment that is depicted, the lever 32 is held at the base body 35 only because the latching projections 33 are designed in the form of hooks or sickles and reach around a lug-shaped abutment 37 of the base body 35. In the unlocking position shown in FIG. 10, the abutment 37 holds the latching projection 33 at the base body 35. When pivoted into the locking position, the lever 32 is supported at the abutment 37, so that its contact point serves as the point of rotation or bearing. At the same time the minimum distance between the lever 32 and the attachment portion 102 decreases, so that the brake light 31 is pressed in between the lever 32 and the seal 103.

It is self-evident that the present invention is not restricted to the exemplary embodiments that are shown. Therefore, the number of catch elements can also be any other number. For example, only one catch element or three, five or more catch elements may be used. The catch elements may be made of metal, in particular sheet metal, or a synthetic plastic material.

LIST OF REFERENCE NUMERALS AND SYMBOLS

1 brake light
2 insertion portion
3 base body
4 catch element
5 lever
6 contact area
7 latching projection
8 edge
9 retaining part
10 latching lug
11 latching recess
21 brake light
22 catch element
31 brake light
32 lever
33 latching projection
34 insertion portion
35 base body
36 latching lug
37 abutment
100 brake light
101 insertion portion
102 attachment portion
103 seal
104 cover
105 electric terminal
106 catch element
107 latching projection
108 locking bar
109 base body
F vehicle component
S recess
R edge The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle light for installation into a recess of a vehicle component, the vehicle light comprising:
   an insertion portion operatively configured to be insertable into the recess of the vehicle component;
   an attachment portion adapted for arranging the vehicle light on an edge of the recess, the attachment portion being operatively configured to extend laterally beyond the insertion portion at least in sections;
   wherein the insertion portion has at least one catch element and at least one locking element, the catch element being operatively configured to be displaceable toward the recess relative to a portion of the insertion portion that is at a fixed position relative to the attachment portion to latch the vehicle light at the vehicle component recess, and the locking element being operatively configured to displace the catch element along said portion of the insertion portion in a direction toward the attachment portion; and
   wherein the locking element is configured as a lever.

2. The vehicle light according to claim 1, wherein the lever is pivotable between an unlocking position and a locking position such that, when the lever is in the unlocking position, the catch element is spaceable at a greater distance from the attachment portion than when the lever is in the locking position; and
   wherein the lever is latchable in the locking position at the insertion portion.

3. The vehicle light according to claim 2, wherein the lever has at least one eccentrically shaped contact area exhibiting a minimum distance from the attachment portion in the locking position that is smaller than in the unlocking position.

4. The vehicle light according to claim 3, wherein the eccentrically shaped contact area of the lever is operatively configured to make contact with the catch element in order to move the catch element.

5. The vehicle light according to claim 3, wherein the lever and the catch element are formed one-piece, and further wherein the eccentrically shaped contact area of the lever lies directly opposite the attachment portion.

6. The vehicle light according to claim 1, wherein the catch element has, at least in sections, a substantially inverse U-shaped cross-sectional profile, each of the legs of the U-shaped cross-sectional profile having at least one outwardly projecting latching projection.

7. The vehicle light according to claim 2, wherein the catch element has, at least in sections, a substantially inverse U-shaped cross-sectional profile, each of the legs of the U-shaped cross-sectional profile having at least one outwardly projecting latching projection.

8. The vehicle light according to claim 3, wherein the catch element has, at least in sections, a substantially inverse U-shaped cross-sectional profile, each of the legs of the U-shaped cross-sectional profile having at least one outwardly projecting latching projection.

9. The vehicle light according to claim 6, wherein the catch element comprises two areas, each of which exhibits the essentially inverse U-shaped cross-sectional profile.

10. The vehicle light according to claim 1, wherein the lever is operatively configured as a clip.

11. The vehicle light according to claim 1, wherein the lever is mounted on the insertion portion in a rotatable manner relative to a uniquely defined axis of rotation.

12. The vehicle light according to claim 1, wherein the lever is pivotable without having an axis of rotation at the insertion portion.

13. The vehicle light according to claim 1, wherein the vehicle light is a third brake light for a motor vehicle.

14. A method for installing a vehicle brake light in a recess of a vehicle component, the method comprising the acts of:
   inserting an insertion portion of the vehicle light through the recess of the vehicle component, the vehicle light comprising: (a) an insertion portion operatively configured to be insertable into the recess of the vehicle component, (b) an attachment portion adapted for arranging the vehicle light on an edge of the recess, the attachment portion being operatively configured to extend laterally beyond the insertion portion at least in sections, wherein the insertion portion has at least one catch element and at least one locking element in the form of a lever, the catch element being operatively configured to be displaceable toward the recess relative to a portion of the insertion portion that is at a fixed position relative to the attachment portion to latch the vehicle light at the vehicle component recess, and the locking element being operatively configured to displace the catch element along said portion of the insertion portion in a direction toward the attachment portion;
   upon the at least one catch element unlatching laterally after passing through the recess, pivoting the at least one lever such that the associated catch element moves in a direction of the attachment portion in order to press, at least in sections, a peripheral region of the vehicle component surrounding the recess between the insertion portion and the attachment portion.

15. The method according to claim 14, wherein the pivoting act further comprises the act of:
   displacing the associated catch element in the direction of the attachment portion via an eccentrically shaped contact area at one end of the lever.

16. The method according to claim 14, wherein the pivoting act further comprises the act of:
   with the lever and the associated catch element being of a one-piece construction, approaching the attachment portion with an eccentrically shaped contact area of the lever.

* * * * *